United States Patent
Gyöngyösi

[19]

[11] Patent Number: 6,088,886
[45] Date of Patent: Jul. 18, 2000

[54] HOSE CLAMP HAVING A SPRING RING DISPOSED WITHIN THE CLAMP

[75] Inventor: Jürgen Gyöngyösi, Hanau, Germany

[73] Assignee: Rasmussen GmbH, Maintal, Germany

[21] Appl. No.: 09/104,448

[22] Filed: Jun. 25, 1998

[30] Foreign Application Priority Data

Jul. 1, 1997 [DE] Germany ............................ 197 27 886
Sep. 30, 1997 [DE] Germany ............................ 197 43 121

[51] Int. Cl.$^7$ .................................................. F16L 33/02
[52] U.S. Cl. .......................... 24/279; 24/20 CW; 24/20 R
[58] Field of Search ........................ 24/279, 274 R, 24/271, 20 R, 20 CW, 20 EE, 20 LS, 20 S; 285/112, 253, 252; 248/74.2, 74.1

[56] References Cited

U.S. PATENT DOCUMENTS

| | | |
|---|---|---|
| 1,978,195 | 10/1934 | Haas . |
| 2,936,503 | 5/1960 | Rindfleisch ............................ 24/279 |
| 3,303,669 | 2/1967 | Oetiker ............................ 24/20 CW |
| 3,789,463 | 2/1974 | Oetiker ............................ 24/20 CW |
| 4,312,101 | 1/1982 | Oetiker ............................ 24/20 R |
| 4,350,063 | 9/1982 | Koehler ............................ 24/279 |
| 4,882,814 | 11/1989 | Takahashi . |
| 5,115,541 | 5/1992 | Stichel . |
| 5,137,305 | 8/1992 | Straub ............................ 285/112 |
| 5,309,607 | 5/1994 | Hohmann et al. . |
| 5,353,478 | 10/1994 | Spors . |
| 5,384,936 | 1/1995 | Van Walraven ............................ 24/279 |
| 5,499,430 | 3/1996 | Strazar . |
| 5,630,255 | 5/1997 | Eliasson ............................ 24/274 R |
| 5,675,871 | 10/1997 | Webb et al. . |

FOREIGN PATENT DOCUMENTS

| | | |
|---|---|---|
| 0 627 591 A1 | 5/1994 | European Pat. Off. . |
| 89 03 321 | 3/1989 | Germany . |
| 40 05 631 C2 | 2/1990 | Germany . |
| 41 27 017 C1 | 8/1991 | Germany . |
| 4108852 | 9/1992 | Germany ............................ 24/279 |
| 42 37 330 C1 | 11/1992 | Germany . |
| 43 05 649 C2 | 2/1993 | Germany . |
| 52-21023 | of 0000 | Japan . |
| 59-94690 | of 0000 | Japan . |
| 62-45496 | of 0000 | Japan . |
| 8-312861 | of 0000 | Japan . |
| 9-144967A | of 0000 | Japan . |

*Primary Examiner*—Anthony Knight
*Assistant Examiner*—Robert J. Sandy
*Attorney, Agent, or Firm*—Darby & Darby

[57] ABSTRACT

A clamp for clamping a hose fast on a pipe clamp that includes a clamp band and a spring ring that is fixed with a first portion thereof to the clamp band. The spring ring elastically clamps the hose when the clamp is initially fitted on the hose, but is not yet clamped fast to the hose At least a second portion of the spring ring is at least predominantly disposed within the clamp band. The spring ring is made of spring steel sheet so that the clamp can be made compact to save material. The spring ring provides a firmer locking of the initially fitted clamp on the hose and ensures that the clamping force of the clamp is more uniformly distributed over the periphery of the hose because the clamp can slide on the outer circumferential surface of the spring ring.

14 Claims, 1 Drawing Sheet

HOSE CLAMP HAVING A SPRING RING DISPOSED WITHIN THE CLAMP

BACKGROUND OF THE INVENTION

1. Field of the Invention

The present invention relates to a hose clamp having a clamp band and a spring ring that is fixed by a first portion thereof to the clamp band. The spring ring elastically clamps the hose when the hose clamp is initially fitted on the hose, but is not yet clamped fast to the hose.

2. Discussion of the Related Art

Commercially available hose clamps have a worm driven clamp in which a tightening screw engages the clamp band first end portion in a housing that is fixed to the clamp band second end portion. A spring ring of plastic material is fixed to the housing by a substantially semicircular portion that is disposed at one axial end of the spring ring and surrounds the housing on the outside thereof. The remaining portion of the spring ring comprises two parallel arcuate limbs, which, in the initially fitted position, surround the hose axially beside the clamp band and elastically clamp the spring ring and clamp band in place on the hose. In the initially fitted position, the clamp band is in the open position (i.e., the clamp band has not yet been clamped fast to the hose). These commercially available hose clamps having a spring ring are expensive, bulky and unwieldy and are only available for use with worm driven clamps.

Accordingly, it is an object of the present invention to provide a hose clamp with a spring ring that is less expensive, less bulky and easier to operate than the currently commercially available hose clamps that have a spring ring.

SUMMARY OF THE INVENTION

This object is achieved, according to the present invention, with a spring ring that has a second portion that at least predominantly (i.e., substantially) lies axially within the clamp band. The second portion of the spring ring does not project to a substantial extent axially beyond the clamp band. In accordance with a further embodiment of the present invention, the spring ring does not project axially beyond the clamp.

The spring ring according to the present invention, therefore, takes up less space and is less bulky than convention plastic spring rings. Additionally, after the initial fitting operation, the clamp band is moved to the closed position so that the hose clamp clamps the hose fast on a pipe. In and during movement to this closed position, the clamp band can slide on the radial outer surface (i.e., the outer circumferential surface) of the second portion of the spring ring easier than the clamp band can slide on the outer surface of the hose. Thus, the tightening or clamping force of the hose clamp when the hose is clamped fast on the pipe, is more uniformly distributed over the periphery of the hose. Additionally, the clamping force itself is higher. Because the spring ring lies entirely within the clamp band, it takes up less space and is less bulky than conventional spring rings.

The spring ring is preferably made of spring steel so that the spring ring can produce a higher clamping force than a spring ring that is made of a plastic material. In the initially fitted position, when the hose clamp is not yet clamped fast, the clamp is more firmly seated on the hose.

If the spring ring is made of spring steel sheet, it is flat and can be compactly disposed between the clamp band and the hose.

The axial width of at least the second portion of the spring ring is less than or equal to the axial width of the clamp band so that the spring ring takes up a small amount of space and is less bulky.

The spring ring preferably has axial edges that are raised radially outwardly over at least a portion of its circumferential length. The clamp band is received between the axial edges. If the raised edges are spaced from each other to just correspond to the axial width of the clamp band, then only the raised edges of the spring ring axially project on both sides beyond the clamp band by an amount that corresponds approximately to the thickness of the spring ring material. The raised edges stiffen the spring ring so that it can be made from thinner material. In addition, the raised edges serve as a guide means for the clamp band. Finally, the outer edge of the spring ring can be rounded off in order to reduce the risk of damaging the hose.

The raised edges are preferably formed by bending the sheet, which simultaneously provides the desired rounded edge configuration.

The first portion is preferably connected to the clamp in a positive-locking relationship or by intimately joining the materials. The intimately joined materials can be connected, for example, by welding or gluing. The positive-locking relationship can be made, for example, by riveting or by bending a portion of the spring band around the clamp band. The positive-locking relationship can also be made by lugs, which are partially stamped out of the spring steel sheet. The lugs engage in holes in the clamp band and are thereafter bent around the edges of the holes.

A radially acting spring is optionally disposed between the first portion of the spring band and the clamp band. The ends of the first portion are spaced apart from each other in the circumferential direction of the clamp and are connected to the clamp band in a positively locking relationship (e.g., a portion of the spring ring is bent around the clamp band). The ends of the first portion are displaceable in the circumferential direction with respect to the clamp band. The ends of the first portion are disposed radially inside of the clamp band. The spring ring holds the spring, which permits the clamp to tighten or relax to compensate for thermally induced variations in the diameter of the hose.

The spring ring has free ends which are movable relative to each other in the circumferential direction. If the free ends are separated by an axial slot, the spring ring can be produced in a relatively simple fashion from a flat, and possibly smooth material (e.g., a sheet of spring steel).

The free ends of the spring ring may overlap each other in the circumferential direction so that the spring ring will bear against the hose over the entire periphery thereof.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PREFERRED EMBODIMENT

Figure 1:
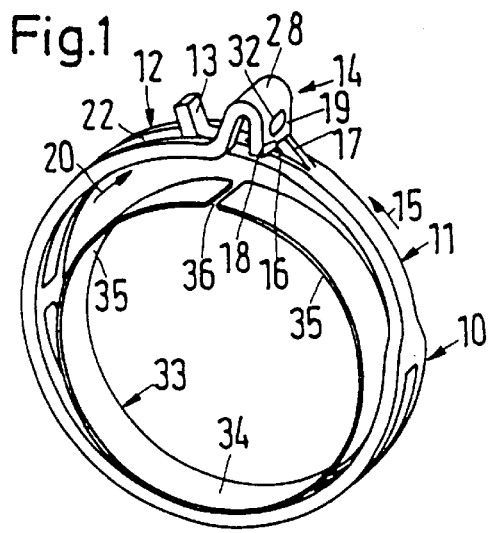
FIG. 1 is a perspective view of a clamp in the form of a spring band clamp having a spring ring connected internally to the clamp in accordance with the present invention.
Figure 2:
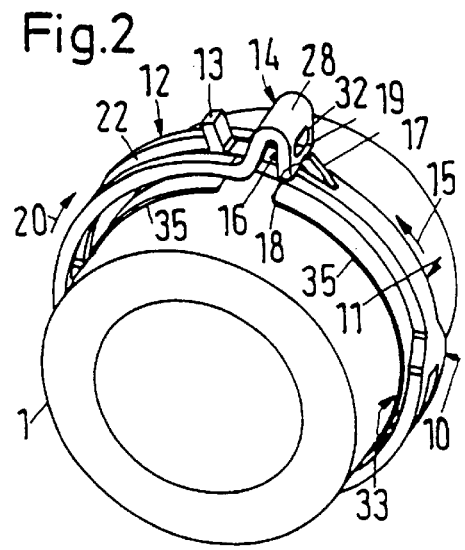
FIG. 2 is a perspective view of the clamp of FIG. 1 being initially fitted on a hose.

Referring now to FIGS. 1 and 2, a clamp band 10 according to the present invention is illustrated. Clamp band 10 is in the form of a spring band clamp, which is preferably made of spring steel. Clamp band 10 acts as a hose clamp for clamping a hose 1 fast about a pipe (not shown). The hose is preferably a cooling water or fuel hose for use in a motor vehicle. The hose is fastened around a pipe or conduit, for example, a pipe connecting member.

Clamp band 10 is preferably made of spring steel or spring steel sheet. Clamp band 10 is curved in an annular configuration, having a first end portion 11 and a second end portion 12. The free end of the first end portion 11 has a radially outwardly bent spreading jaw 13. The free end of the second end portion 12 has a curved spreading jaw 14, which is also directed radially outwardly. The spreading jaws 13 and 14 are used to open the spring band clamp from a closed, unstressed or substantially unstressed position to an open, yet stressed, position. The diameter of the spring band clamp is smaller in the closed position than in the open position, which is shown in FIGS. 1 and 2.

The first end portion 11 has a tongue 17 that is disposed adjacent to spreading jaw 13. Tongue 17 is located behind the spreading jaw 13 with respect to the closing direction of the first end portion 11, which is indicated by arrow 15 in FIG. 1. Tongue 17 is pressed radially outwardly from a U-shaped incision 16. Tongue 17 extends in the closing direction 15 of the end portion and is inclined radially outwardly at an acute angle with respect to the tangential direction of the spring band clamp. The free end of the tongue 17 has an end face that is disposed perpendicularly with respect to the direction of extension of tongue 17. A radial inner edge of the end face forms an abutment means 18, which bears against an abutment surface 19 formed on the outer surface of spreading jaw 14 adjacent to the free end of the spreading jaw 14. The radial inner edge of the end face of tongue 17 bears against abutment surface 19 due to the closing spring force component of the clamp band 10, which is directed in the circumferential direction 15. The second end portion 12 exerts the same closing spring force component in the opposite circumferential direction, as indicated by arrow 20 in FIG. 1.

The abutment surface 19 forms an acute angle with respect to a radius of the clamp that intersects with the radial inner edge of the abutment surface 19. In the open position (see FIGS. 1 and 2), the spreading jaw 14 radially abuts the outer surface of end portion 11.

First end portion 11 is narrower in the axial direction than the second end portion 12. First end portion 11 passes from the inside radially outwardly through a circumferential slot 22 in the second end portion 12.

Spreading jaw 14 forms a corrugation 28 in the shape of a halfwave. Corrugation 28 projects radially outwardly somewhat further than spreading jaw 13. The radially inwardly projecting free end portion of corrugation 28 has a throughhole 32 for the engagement of the tangs of a pliers-like tightening tool, which may be brought into engagement with the spreading jaws 13 and 14 to move the clamp band into the open position. In the open position, throughhole 32 is disposed radially outwardly with respect to tongue 17.

A spring ring 33 is connected by a first portion 34 thereof to the inside of the clamp band 10. Spring ring 33 is connected to the clamp band approximately diametrically opposite to the spreading jaws 13, 14. Spring ring 33 is fixedly connected to clamp band 10 by a procedure that intimately joins the materials. For example, the materials can be joined by gluing or welding, and are preferably joined by spot welding. Spring ring 33 has a second portion 35 that is divided by a continuous axial slot 36.

Spring ring 33 is also preferably made of spring steel and, more preferably, of spring steel sheet. The axial width of spring ring 33 is less than or equal to the axial width of the clamp band 10, as illustrated in the drawing Figures.

If the spring band clamp is in the closed position, tongue 17 is disposed in the region of circumferential slot 22. To move the spring band clamp, against the spring force of the clamp band 10, from the closed position when the clamp band 10 is not yet disposed around a hose 1 and tongue 17 is disposed between the spreading jaws 13 and 14 in the region of slot 22 to the open position illustrated in FIGS. 1 and 2, the spreading jaws 13 and 14 are pressed together in the circumferential direction by means of the tightening tangs of the pliers-like tool that is fitted to the jaws 13, 14. The band clamp will expand radially, until corrugation 28 slides over tongue 17. When the tangs of the pliers-like tool are removed, the spring band clamp contracts until the abutment means 18 and the abutment surface 19 bear against each other (See FIGS. 1 and 2). The clamp band 10 is now in the open position.

In the open position, the spring band clamp 10 is then pushed onto hose 1. The spring ring 33 is then spread open so that its second portions 35 elastically squeeze the hose, as is illustrated in FIG. 2. In this pre-fitted or initially fitted position, clamp 10 is held on the hose so that the hose 1 together with clamp 10 can be easily pushed onto the pipe (not shown), even if the pipe has a circumferentially extending holding rib behind which the clamp is intended to clamp the hose 1 fast onto the pipe. In other words, as the pre-fitted clamp and hose are pushed onto the pipe, the prefitted clamp and hose must pass over the radially bulging out holding rib on the outer circumference of the pipe.

To clamp the pre-fitted clamp and hose, which has now been pushed onto the pipe, the spring band clamp 10 which surrounds the spring ring 33 and the hose 1 is moved from the open position to the closed position. To accomplish this, it is only necessary to insert a conventional screwdriver, which can be operated manually, so that its blade is disposed in the plane of the clamp over spreading jaw 13 and through slot 22 under corrugation 28. The screwdriver is then pivoted in the counter-clockwise direction, with reference to FIGS. 1 and 2, about the free end of the spreading jaw 13, which is used as a pivot point. This pivoting of the screwdriver causes the corrugation 28 to move radially outwardly to a position radially outside of tongue 17 so that the abutment means 18 and the abutment surface 19 are no longer in contact with each other at which point the spring band clamp contracts firmly around the spring ring 33 and, thus, around the hose 1. The spring band clamp 10 can easily contract around the spring ring 33 because the spring ring 33 has a smooth outer circumferential surface. Spring ring 33 can easily slide on the outer surface of hose 1 because the spring ring 33 has a smooth inner circumferential surface as well. The spring ring 33 also ensures that the clamping force applied by the spring band clamp 10 is distributed substantially uniformly and at an overall higher level over the periphery of the hose as compared to the clamping force that would be applied if the spring band clamp were to bear directly against the hose without the use of a spring ring.

FIG. 1 shows the inside diameter of the spring ring 33 before it is fitted en the hose 1. FIG. 2 shows the inside diameter of the spring ring 33 when the clamp 10, spring ring 33 and hose 1 are in the initially fitted position. As illustrated in FIGS. 1 and 2, the inside diameter of spring ring 33 is smaller in the open non-fitted position of FIG. 1 than in the initially fitted position of FIG. 2. The outside diameter of the spring ring 133 is smaller than the inside diameter of the clamp band 10 in the initially fitted position of FIG. 2 and the open non-fitted position of FIG. 1.

Figure 3:
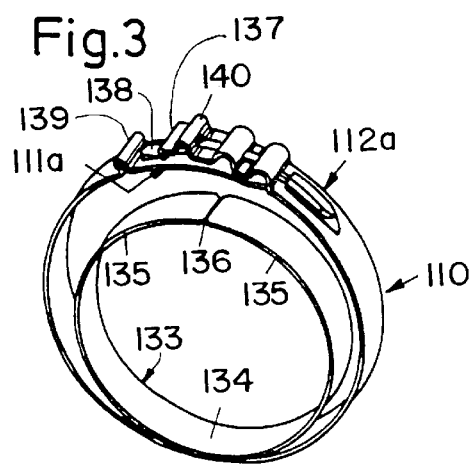
FIG. 3 is a perspective view of a further embodiment of a clamp in the form of a hose clamp with elastic and hookable closure having a spring ring connected internally to the clamp in accordance with the present invention.

FIG. 3 shows a spring ring 33 being used with a hose clamp that is known from German patent specification DE 42 37 330 C1, which corresponds to U.S. Pat. No. 5,353,478, the disclosure of which is hereby incorporated by reference. The clamp is shown in the open position. The end portions 111a and 112a of this clamp overlap each other. The radially outer end portion 112a has a corrugated or wave-like configuration and is provided with a hook-shaped closure 137. The radially inner end portion 111a is also provided with a hook-shaped closure 138. Hook 137 engages with hook-shaped closure 138 to close the clamp. A corrugation 139 of the inner end portion 11a and a corrugation 140 of the outer end portion 112a permit the tangs of a pliers-like tool to engage the corrugations 139, 140 so that the corrugations can be moved toward one another to close the clamp.

Spring ring 133 of FIG. 3 is connected to the inside of the clamp band 110 approximately diametrically opposite to the clamp closure corrugations 139, 140 in the same manner as spring ring 33 is fixedly connected to the clamp band of FIGS. 1 and 2. The procedure for initially fitting the clamp band 110 of FIG. 3 on a hose is also identical to the procedure described above for the clamp band 10 illustrated in FIGS. 1 and 2.

Figure 4:
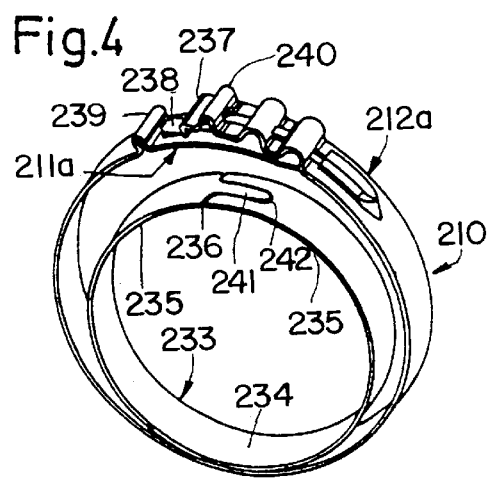
FIG. 4 is a perspective view of the clamp of FIG. 3 having an internally fixed spring ring whose free ends overlap each other.

The embodiment of FIG. 4 differs from that of FIG. 3 only in that the ends of the spring ring 233 engage one another and are disposed in a mutually overlapping relationship in the axial plane of the spring ring 233 so that the transition between the ends of the spring ring when the spring ring 233 bears against the hose in the initially fitted position and the spring ring 233 is spread open somewhat further than is illustrated in FIG. 4 is as continuous as possible. A tongue 241 which prolongs the free end of one end portion 235 of the spring ring 233, engages into an incision 242 in the other free end of the other end portion 235 of spring ring 233.

Figure 5:
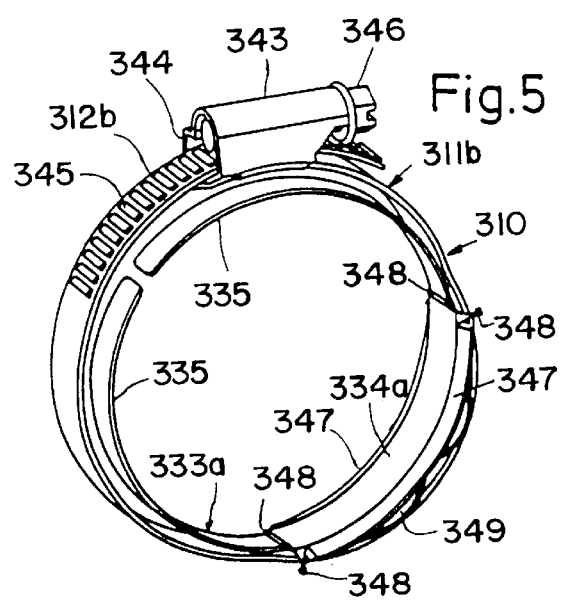
FIG. 5 is a perspective view of a clamp in the form of a worm driven clamp having a spring ring disposed internally within the clamp band. A spring, for compensating for thermally induced variations in the diameter of the hose, is held between the clamp and the spring ring.

FIG. 5 shows a clamp having a conventional worm drive as is known, for example, from German patent specifications DE 40 05 631 C2 or DE 41 27 017 C1, which correspond to U.S. Pat. Nos. 5,115,541 and 5,309,607, respectively, the disclosures of which are hereby incorporated by reference. In this worm driven clamp, the end portion 311b of the clamp band 310 is fixed to the bottom of an approximately tunnel-shaped housing 343. Housing 343 has an axially projecting portion 344. The other end portion 312b of the clamp band 310 is provided with a plurality of rib-like thread portions 345, which are impressed into the band. End portion 326b is guided over the end portion 311b through the housing 343 in which the thread portions 345 co-operate with the thread of a tightening screw 346 to tighten or loosen the clamp.

A spring ring 333a is connected by a first position 334a thereof to the inside of clamp band 310. Portion 334a has substantially radially outwardly bent-over edge flanges 347. Additionally, at its ends, portion 334a has lugs 348, which are bent around over the edges of the clamp band 310 to positively lock the spring ring 333a to the clamp band 310. The second portions 35 of the spring ring 33a are identical to the embodiments of FIGS. 1–3. A spring 349 is disposed between portion 334a of the spring ring 333a and the clamp band 310. Spring 349 is preferably in the form of a corrugated leaf spring, the spring force of which acts radially. The positively locking connection of the spring ring 333a to the clamp band, 310 by the lugs 348 permits a slight degree of displacement of the first portion 334a in the circumferential or peripheral direction of the clamp due to the force of the spring 349. Thus, spring 349 performs the same function as the spring disclosed in German patent Specifications DE 40 05 631 C2 (U.S. Pat. No. 5,115,541) and DE 41 27 017 C1 (U.S. Pat. No. 5,309,607). More specifically, spring 349 permits the hose clamp to tighten or loosen in the event of thermally induced variations in thickness and diameter of the hose material. Therefore, spring 333a holds the clamp on the hose when the clamp is in the initially fitted position and secures the spring 349 in position between the spring ring first portion 334a and the clamp band 310.

Spring rings 333 and 333a can also be used with different types of hose clamps having a clamp band. In addition, spring rings 33, 133 and 333a of FIGS. 1–3 and 5 may be provided with overlapping ends, just like the spring ring 233 described above and illustrated in FIG. 4. Spring ring 33, 133, 233, 333a can alternatively be made from a wire having one or more helical turns instead of being in the form a leaf spring. In the illustrated embodiments, the spring rings are made from spring steel sheet. They may, however, be made of plastic materials.

Figure 6:
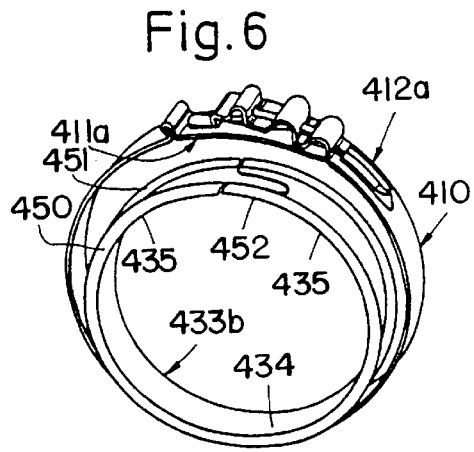
FIG. 6 is a perspective view of a further embodiment of the clamp in the form of a hose clamp having an internally connected spring ring with raised edges.

The embodiment of FIG. 6 substantially corresponds to that shown in FIG. 4. A principle difference is that the spring ring 433b has a raised edge 450, 451 at each of its two sides (i.e., each of its axial ends). The two raised edges 450, 451 are spaced from each other by a distance that is preferably larger than the axial width of the clamp band 410, but this distance may also be equal to the axial width of clamp band 410. The spring ring 433b is, therefore, disposed substantially completely within the clamp.

Spring ring 433b is preferably made of relatively thin spring steel sheet and has a thickness of 0.5 mm. The edges are produced by bending so that a rounded configuration is provided at edge 452.

The spring rings 33, 133, 233 and 333a may also be provided with raised edges as shown in FIG. 6 over their entire circumference or over a substantial part of their circumference.

Having described the presently preferred exemplary embodiment of a hose clamp having a spring ring disposed within the clamp in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. A hose clamp for clamping a hose fast on a pipe, said clamp comprising:

a clamp band having an inner circumferential surface and an outer circumferential surface; and a spring ring having a first portion and a second portion, said spring ring being connected to the inner circumferential surface of the clamp band at said first portion, said spring ring elastically clamping the hose when the clamp band is initially fitted on the hose but is not yet clamped fast to the hose, at least said second portion of said spring ring being substantially disposed axially within said clamp band.

2. The clamp according to claim 1, wherein said spring ring is made of spring steel.

3. The clamp according to claim 1, wherein said spring ring is made of spring steel sheet.

4. The clamp according to claim 3, wherein said spring ring has a first axial edge and a second axial edge, said first axial edge and said second axial edge each being raised radially outwardly at least over a part of its circumferential length, said first axial edge and said second axial edge receiving said clamp band therebetween when said clamp band is clamped fast to the hose.

5. The clamp according to claim 4, wherein the raised edges are formed by bending portions of said spring steel sheet.

6. The clamp according to claim 1, wherein the axial width of at least said second portion of said spring ring is equal to or less than the axial width of said clamp band.

7. The clamp according to claim 1, wherein said spring ring has a first axial edge and a second axial edge, said first axial edge and said second axial edge each being raised radially outwardly at least over a part of its circumferential length, said first axial edge and said second axial edge receiving said clamp band therebetween when said clamp band is clamped fast to the hose.

8. The clamp according to claim 1, wherein said first portion is connected to said clamp band in a positively locking relationship.

9. The clamp according to claim 1, wherein said first portion is fixedly connected to said clamp band by intimately joining said spring ring and said clamp band.

10. The clamp according to claim 1, further comprising a radially acting spring disposed between said first portion and said inner circumferential surface of said clamp band.

11. The clamp according to claim 10, wherein said spring ring has a first circumferential end and a second circumferential end, said first circumferential end being spaced from said second circumferential end, said first circumferential end and said second circumferential end each being connected in a positive-locking relationship to said clamp band, said first circumferential end and said second circumferential end each being displaceable in a circumferential direction.

12. The clamp according to claim 1, wherein said spring ring has free ends that are movable relative to each other in the circumferential direction.

13. The clamp according to claim 12, wherein said free ends of said spring ring overlap each other in the axial direction.

14. The clamp according to claim 12, wherein said free ends of said spring ring are spaced apart from each other in the circumferential direction.

\* \* \* \* \*